United States Patent [19]

Swaim

[11] 4,027,798
[45] June 7, 1977

[54] LOCKABLE RACK FOR FISHING RODS AND THE LIKE

[76] Inventor: Gayland Clarence Swaim, 4922 Mount Bigelow Drive, San Diego, Calif. 92111

[22] Filed: July 14, 1976

[21] Appl. No.: 705,054

[52] U.S. Cl. .................................. 211/4; 211/60 R; 248/203
[51] Int. Cl.² ........................................ A47F 5/00
[58] Field of Search .............. 292/328, 331; 70/19, 70/58, 59, 61, 62, DIG. 57; 211/4–9, 17–24, 60–69, 105.1, 123; 248/203, 57, 307, 70, 315, 316 A, 298; 224/42.1, 42.4 S

[56] References Cited

UNITED STATES PATENTS

| | | | |
|---|---|---|---|
| 1,221,584 | 4/1917 | Patrick | 211/60 R X |
| 2,482,341 | 9/1949 | Holmsten | 70/DIG. 57 |
| 2,791,335 | 5/1957 | Leebow | 211/8 X |
| 2,946,452 | 7/1960 | Caloiero et al. | 211/4 |
| 3,138,260 | 6/1964 | Tedrick | 248/203 X |
| 3,635,433 | 1/1972 | Anderson | 211/60 R X |
| 3,876,076 | 4/1975 | Hazelhurst | 211/4 |

Primary Examiner—Roy D. Frazier
Assistant Examiner—Terrell P. Lewis
Attorney, Agent, or Firm—Brown & Martin

[57] ABSTRACT

A lockable rack for holding one or more fishing rods, spear guns, or similar rod-like articles, the rack being adaptable to installation on or in a vehicle, or in a building such as a garage. The rack has a mounting plate for attachment to a suitable supporting surface, the plate having open hooks to hold the rod articles. A sliding bar is secured on the mounting plate and has hook portions which meet and close the hooks of the mounting plate to retain the rod articles. A conventional padlock secures the sliding bar to the mounting plate in closed position, in which position the sliding bar also conceals the retaining screws of the mounting plate.

5 Claims, 8 Drawing Figures

LOCKABLE RACK FOR FISHING RODS AND THE LIKE

BACKGROUND OF THE INVENTION

Fishing rods carried in or on a vehicle are usually held in some type of rack or holder, and secured by spring clips, straps, or similar readily releasable retaining means. Without some type of lock the articles are easily stolen. One type of lockable rack has a socket for each rod and a swing over bar which holds all the rods in place, and can be locked. However, this type cannot be hung from an overhead structure or on a vertical surface, since when the retaining bar is opened, all the rods can fall out. Elaborate types for single or multiple rods are also available, but are expensive and often inconvenient to use.

SUMMARY OF THE INVENTION

The rack described herein will hold one or more rods in hooked retainers and can be mounted upright, inverted, or on a vertical surface. The hooked retainers are on a flat mounting plate which is secured to a supporting surface by screws, or similar means. A sliding bar attached to the mounting plate has hook portions which overlap and close the hooked retainers in a closed position to retain the rods. In the closed position the sliding bar also conceals the screws which hold the mounting plate, so that the rack cannot be removed from its support. A padlock is secured through corresponding openings at one end of the mounting plate and sliding bar to lock the rack.

The rack is a very simple structure which can be stamped or cut from sheet metal at minimum cost. Multiple rack units can be installed in end to end engagement, and a single lock will secure the entire assembly.

The primary object of this invention, therefore, is to provide a new and improved lockable rack for fishing rods and the like.

Another object is to provide a lockable rack which will hold rods in place in any installed position of the rack, in both locked and open positions of the rack.

Another object of this invention is to provide a lockable rack having a fixed portion by which the rack is mounted, and a sliding portion which opens and closes supporting hooks in which the rods are held.

A further object of this invention is to provide a lockable rack which is easily made from two pieces of sheet metal.

Other objects and advantages will be apparent in the following detailed description, taken in conjunction with the accompanying drawing, in which.

DESCRIPTION OF THE PREFERRED EMBODIMENT

Figure 1:
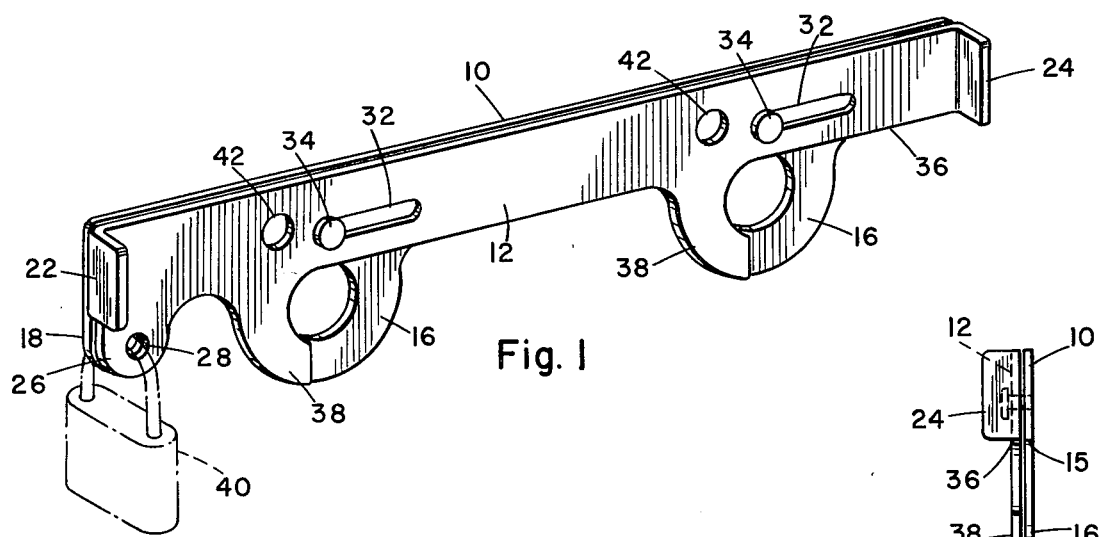
FIG. 1 is a perspective view of the rack in closed position.

The rack unit is composed of two parts, a flat mounting plate 10 and a slide bar 12. Mounting plate 10 is basically an enlongated rectangular element and has countersunk screw holes 14 for attachment to a supporting structure. Projecting from one longitudinal edge 15 of the mounting plate are support hooks 16, in the same plane as the plate, the hooks extending for slightly more than half a circle to hold a rod therein. Two support hooks are shown as an example, but any suitable number may be used, the size and spacing of the hooks depending on the type of rod articles to be carried. At one end of the mounting plate 10 is a locking lug 18, projecting from the same edge 15 as the hooks 16 and having a lock receiving hole 20 therein.

Slide bar 12 is a flat rectangular element similar in size to the mounting plate 10, but having perpendicularly turned tabs 22 and 24 at opposite ends. At one end of the slide bar 12 is a locking lug 26 having a lock receiving hole 28 and corresponding to locking lug 18.

Fixed in the mounting plate 10 are retaining pins 30, which project through longitudinally elongated guide slots 32 in the slide bar 12. Retaining pins 30 have enlarged heads 34 to secure the slide bar to the mounting plate in a freely slidable assembly.

Figure 2:
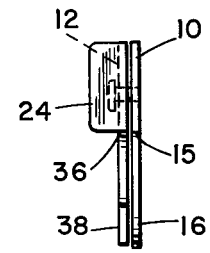
FIG. 2 is an end elevation view as taken from the right hand end of FIG. 1.
Figure 3:
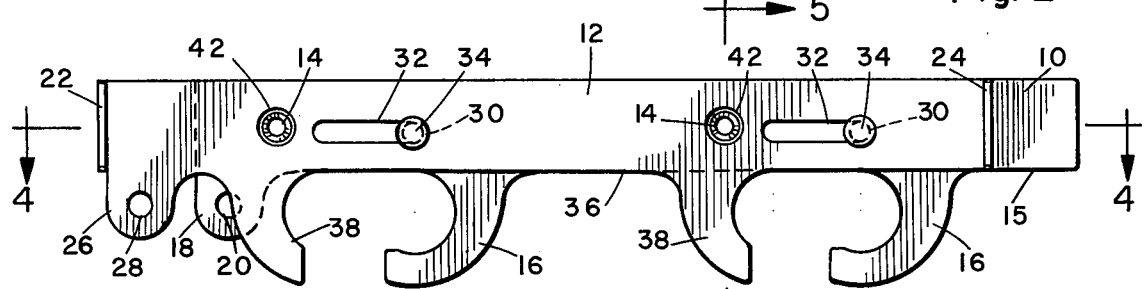
FIG. 3 is a front elevation view of the rack in open position.

Projecting from the longitudinal edge 36 of slide bar 12 are coplanar hook portions 38, which, in the closed position of the rack, overlap and close the support hooks 16, as in FIG. 1. The length of guide slots 32 is such that at one limit of travel, the hooks are securely closed and locking lugs 18 and 26 are aligned to receive a conventional padlock 40 through holes 20 and 28. At the other limit of travel, as in FIG. 2, the hooks are fully opened for insertion or removal of rods.

Slide bar 12 also has spaced access holes 42 which, in the open position of the rack, expose the screw holes 14. In the closed position of the rack the screw holes are concealed by the slide bar.

Figure 5:
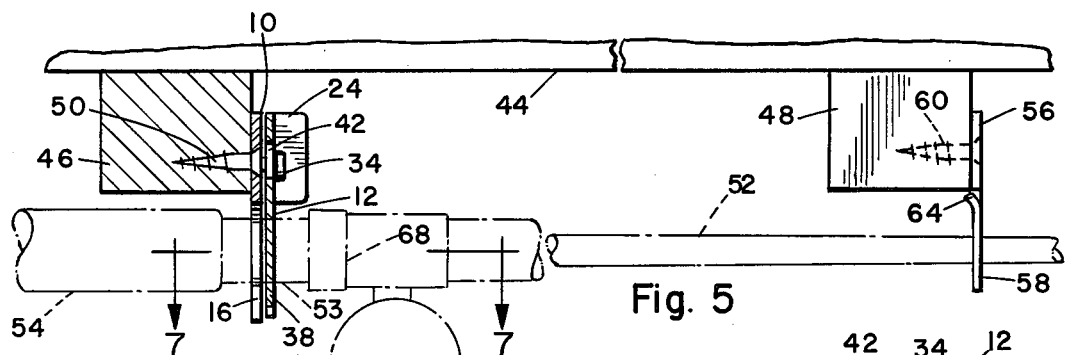
FIG. 5 is a sectional view taken on line 5—5 of FIG. 3, and showing the attachment of the rack to supporting structure.
Figure 6:
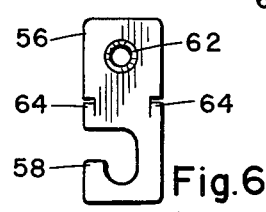
FIG. 6 is a front elevation view of an auxiliary hook bracket for supporting the tip end of a rod held in the rack.

A typical mounting is illustrated in FIG. 5, in which the supporting structure includes a supporting surface 44 with a pair of spaced cross members 46 and 48. The structure could be the roof of a vehicle, the ceiling of a garage, or a vertical wall, or any other structure on which the rack would be mounted. Mounting plate 10 is secured to cross member 46 by screws 50 through holes 14, with the hook elements projecting beyond the cross member. A fishing rod 52 is shown supported in hook 16 by the shank 53 projecting from its butt or hand grip portion 54. The other end of the rod is supported in a hook bracket 56, which is a simple flat plate having an open hook portion 58 to hold the stem of the rod. The hook bracket 56 is secured to cross member 48 by a screw 60 through a screw hole 62. Small prongs 64 are punched out of the edges of hook bracket 56 to locate and align the bracket on the cross member. The hook bracket could obviously be modified to suit other types of rod articles. The rod is placed in the rack with the reel 66 on the side of the rack opposite the hand grip 54, so that the rod cannot be pulled out of the rack.

Figures 7, 8:
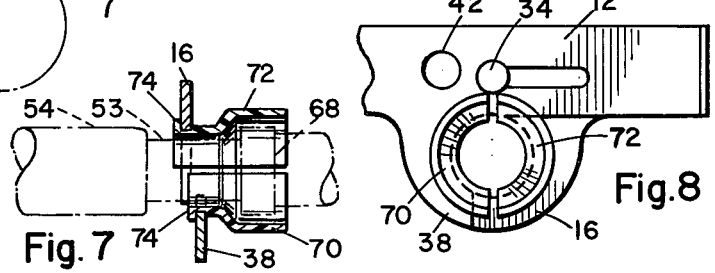
FIG. 7 is a sectional view taken on line 7—7 of FIG. 5, and showing an optional reel protecting attachment.
FIG. 8 is a front elevation view of a portion of the rack with the reel protecting attachment.

If the reel 66 is the type which is secured by a collar or nut 68 threaded on shank 53, the reel may be protected against theft, by a simple attachment shown in FIGS. 7 and 8. A pair of semi-cylindrical cup members 70 and 72 are secured to hook portion 38 and hook 16, respectively. Attachment may be by any suitable means, such as the grooved annular flange 74 which snaps over the edge of the respective hook element. The cup members extend around and enclose the nut 68 when the rack is closed, so that the nut cannot be turned.

Figure 4:
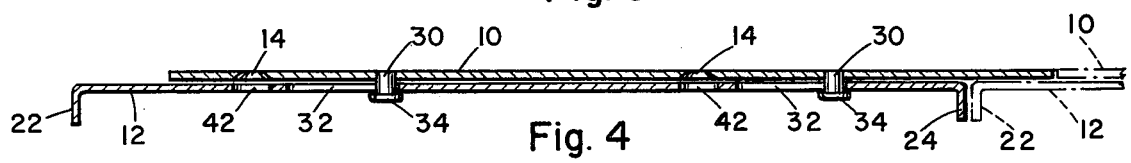
FIG. 4 is a sectional view taken on line 4—4 of FIG. 3.

The rack can also be mounted in inverted position, such as on top of a vehicle or on the deck of a boat. Also, if more than one rack is required, they can be mounted in end to end relation. Portions of a second rack are indicated in broken line in FIG. 4. It can be seen that the tab 24 of one rack engages the tab 22 of the next rack, so that the slide bars 12 move together. A single lock at the end will thus secure any number of racks in an end to end engaging series.

With one fixed part and one moving part, both made from heavy gauge sheet metal, the rack is very simple and economical to make and is easy to operate. The rods remain in place when the rack is open and are easily inserted or removed.

Having described my invention, I claim:

1. A lockable rack for fishing rods and the like, comprising:
    an elongated mounting plate having at least one open hook extending from one longitudinal edge thereof;
    an elongated slide bar longitudinally slidably mounted on said mounting plate to move between an open position and a closed position;
    said slide bar having at least one hook portion extending from one longitudinal edge to overlap and close the open hook on said mounting plate in the closed position;
    said mounting plate having screw receiving holes therein for attachment to a supporting surface;
    said slide bar having access openings therein to expose said screw receiving holes in the open position;
    and locking means on said mounting plate and slide bar for receiving a lock in the closed position.

2. A lockable rack according to claim 1, and including substantially semi-cylindrical cup members secured in said open hood and hook portion, respectively, to encircle and enclose the reel retaining nut of a fishing rod held in the rack when the rack is in the closed position.

3. A lockable rack for fishing rods and the like, comprising:
    an elongated mounting plate having at least one open hook extending from one longitudinal edge thereof;
    an elongated slide bar longitudinally slidably mounted on said mounting plate to move between an open position and a closed position;
    said slide bar having at least one hook portion extending from one longitudinal edge to overlap and close the open hook on said mounting plate in the closed position;
    said slide bar having longitudinally extending guide slots therein;
    said mounting plate having retaining pins fixed thereto and projecting through said guide slots, the slots limiting the sliding movement of the slide bar to the open and closed positions;
    said mounting plate having screw receiving holes therein for attachment to a supporting surface;
    said slide bar having access openings therein to expose said screw receiving holes in the open position, and the slide bar concealing the holes in the closed position;
    said slide bar having a tab at each end thereof projecting perpendicular to the slide bar;
    and locking means on said mounting plate and slide bar for receiving a lock in the closed position.

4. A lockable rack according to claim 3, wherein said locking means includes a locking lug projecting from said one longitudinal edge of the mounting plate, and a corresponding locking lug projecting from said one longitudinal edge of the slide bar, said locking lugs having lock receiving holes therein for alignment in the closed position of the slide bar.

5. A lockable rack according to claim 3, wherein said mounting plate is a flat plate element and said open hooks are coplanar therewith, said slide bar being a substantially flat plate element with the hook portions coplanar therewith.

* * * * *